Figure 1:
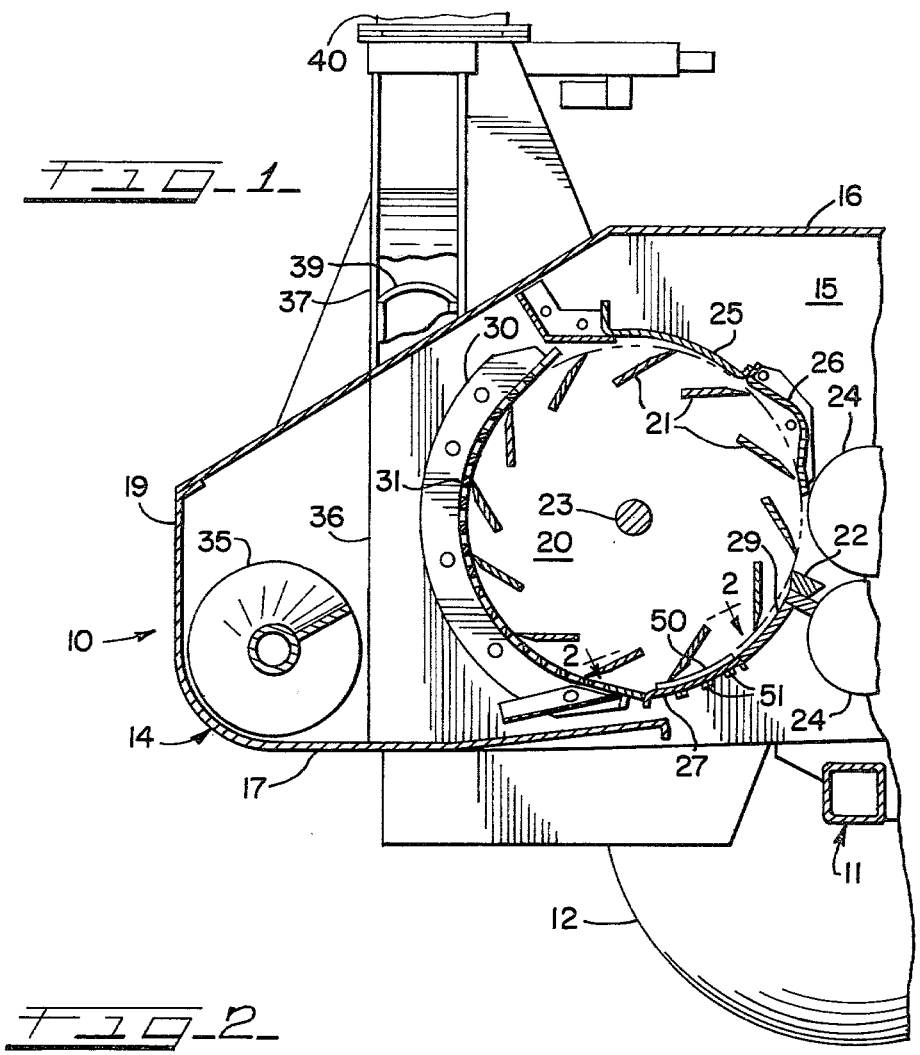

United States Patent [19]

Carey et al.

[11] 4,312,481
[45] Jan. 26, 1982

[54] CUTTERHEAD CROP REDIRECTORS

[75] Inventors: Thomas A. Carey, Plainfield; Elmer M. Kesl, Downers Grove, both of Ill.

[73] Assignee: International Harvester Company, Chicago, Ill.

[21] Appl. No.: 114,180

[22] Filed: Jan. 22, 1980

[51] Int. Cl.³ .............................................. B02C 18/22
[52] U.S. Cl. .................. 241/101.7; 241/221; 241/242
[58] Field of Search ............... 241/101.7, 221, 222, 241/223, 242

[56] References Cited

U.S. PATENT DOCUMENTS

| | | | |
|---|---|---|---|
| 2,222,074 | 11/1940 | Hauge | 241/242 X |
| 2,385,767 | 9/1945 | Wagner | 241/222 X |
| 3,395,868 | 8/1968 | Dodgen et al. | 241/222 X |
| 3,525,375 | 8/1970 | Heising | 241/222 |
| 4,033,518 | 7/1977 | Fleming et al. | 241/222 X |
| 4,252,281 | 2/1981 | Storm et al. | 241/222 |

OTHER PUBLICATIONS

Pull/Type Harvesters-by Sperry-New Holland-Publ. No. 718-770-890-Mar. 1977.
Operator's Manual-by J. Deere, Issue No. Ho, p. 25 for No. 38 Forage Harvester.

*Primary Examiner*—Howard N. Goldberg
*Attorney, Agent, or Firm*—Dennis K. Sullivan; F. David AuBuchon

[57] ABSTRACT

A forage harvester including an imperforate peripheral shield for the cutterhead extending from the shear bar in the direction of rotation and a plurality of parallel elongated bars mounted on the face of the shield adjacent the cutterhead periphery and disposed at an obtuse angle to the direction of rotation, preferably greater than the obtuse angle of the cutterhead knives to the direction of rotation.

6 Claims, 2 Drawing Figures

CUTTERHEAD CROP REDIRECTORS

This invention is related to forage harvesters of the type including a rotary reel cutterhead operating against a stationary shear bar and, more particularly, to improvements in the peripheral shielding for the cutterhead involving the addition of apparatus to the inner surface of the imperforate peripheral shielding beneath the shear bar to redirect the flow of crops, primarily ear corn silage, after its initial cutting by the shear bar.

In most commercial forage harvesters in use today, the cutting knives are disposed on the cutterhead periphery at an angle to the rotational axis, the knife edges forming a portion of a helix. This apparently promotes a slicing action against the stationary shear bar of the crops passing into the cutterhead as well as the simple chopping action which would result if the knives are disposed parallel to the rotational axis. At any rate, the cut crop tends to move perpendicularly to the blade and, due to the angle of the blade, bunches up on one side of the cutting cylinder housing. Bunching can also be due to uneven feeding of the cutting cylinder from the the associated crop gathering unit (not shown). While of some detriment generally, when a recutter screen is used to further comminute the crops, this bunching of cut crops to one side results in uneven distribution of material on the screen which in turn results in undesirable recycling of the crops around the cutterhead and clogging of the left side of the housing discharge area in the region just forward of the transverse discharge auger.

Accordingly, it is the primary object of the invention described herein to provide a forage harvester cutting cylinder with apparatus to redirect the flow of crops exiting the shear bar to provide a uniform distribution across the cutting cylinder.

The above object and others, as will become apparent hereinafter, is specifically met by providing an imperforate peripheral shield extending from the shear bar in the direction of rotation and mounting, on the face of the shield adjacent the cutterhead periphery, a plurality of parallel elongated bars disposed at an obtuse angle to the direction of rotation, preferably greater than the obtuse angle of the cutterhead knives to the direction of rotation. The net effect of providing these redirector bars is to move the cut crops in the opposite transverse direction from that imparted to the crops by the cutterhead knives. The bars have the further advantage of providing a secondary cooperative comminuting elements which assist in the further reduction of leaves and husks, and in cracking corn kernels.

Figure 2:
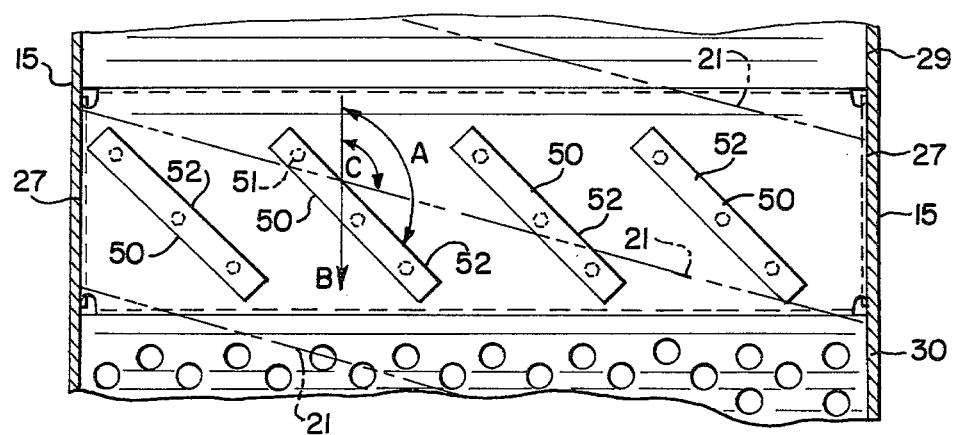

Other objects and advantages of the invention will become apparent upon reference to the detailed description of the invention and upon reference to the drawings in which:

FIG. 1 is a fore-and-aft cross section of the cutting cylinder portion of a forage harvester incorporating the present invention; and FIG. 2 is a view of the inside of the lower peripheral shielding of the cutting cylinder of FIG. 1 taken along the line 2—2 thereof illustrating the crop redirector bars and showing the cutting edges of the cutterhead knives in phantom lines.

Turning to the drawings, there is shown in FIG. 1 the rear portion of a forage harvester generally designated 10 of the general type illustrated, for example, in U.S. Pat. No. 3,730,441, issued May 1, 1973, including a frame assembly 11 supported by ground wheels 12. A cutterhead housing assembly 14 is mounted on the frame 11 and includes fore-and-aft extending side sheets 15, top sheet 16 and a discharge pan or floor sheet 17, the latter terminating in an upturned rear wall 19 forming the rear portion of an auger trough. Rotatably mounted on transverse axis 23 within the cutterhead housing 14 is a rotary reel type cutterhead shown schematically at 20 which is provided adjacent its periphery with a plurality of cutting knives 21 disposed in fixed position thereon. The cutting edges of the knives 21 are disposed at a helical angle to the transverse axis 23 as is well known in the art. When the cutterhead 20 is rotated about is transverse axis, the knife edges 21 form a cylindrical cutting periphery. Disposed adjacent the cutting periphery on the forward crop inlet side of the cutterhead is a stationary shear bar 22 which cooperates with the edges of the rotary knives 21 to chop crops fed to the cutting cylinder by means of and between the feed rolls 24 disposed in the inlet of the housing 14 forwardly of the shear bar 22. Except in the region immediately above the shear bar, the forward portion of the cutterhead periphery is substantially fully closed by imperforate peripheral shields 25, 26 and 27 which retain crops from escaping forwardly of the cutterhead. The rearward portion of the periphery of the cutterhead 20 is enclosed by a recutter screen 30 comprising a foraminous cylindrical portion 31 disposed in closely spaced relationship to the edges of the knives 21 and preferably abutting the lower peripheral shield 27. Disposed rearwardly of the recutter screen 30 in the discharge outlet of the housing 14 is a transverse auger 35 for moving material transversely in the trough formed by the rear wall 19 and the forward wall 36 to the opposite side of the harvester from the cutterhead housing whereat the crops are infed into a crop blower 37 having paddles 39 rotatably driven thereinside which deliver material out through discharge chute 40 into a trailing forage wagon (not shown).

In accordance with the invention, a plurality of elongated crop redirector bars 50 are mounted to the inner surface 29 of the imperforate rim shield 27 as by bolts 51. As shown in FIG. 2, the redirector bars 50 are parallelly disposed at an obtuse angle A, preferably about 135°, to the direction of rotation of the cutterhead knives indicated by the arrow B in FIG. 2. It will be seen that the obtuse angle A is greater than the obtuse angle C of the helical knife edges 21 of the cutterhead 20 to the direction of rotation. Thus, when the upper surface of the redirector bars 50 is raised sufficiently from the imperforate shield 27 to lie closely adjacent the cutterhead periphery, the leading edges 52 of the elongated redirector bars 50 also form secondary comminution elements or shear bars which further reduce the crop material.

It will be seen that the leftward end of the left redirector bar 50 is spaced closely to the leftward edge of the imperforate shield 27 in order to prevent crops from passing along the side wall 15 of the cutterhead housing 14 and redirect them rightwardly. The adjacent bars are positioned in nearly transversely overlapping relation in order that the vast majority of crops will be redirected toward the right side of the machine.

Thus there has been provided in accordance with the invention cutterhead crop redirectors which fully satisfy the objects, aims and advantages expressed above. Many alterations and modifications will become apparent to those or ordinary skill in the art upon reading the foregoing specification. For example, the elongated bars 50 might be welded on or cast into the rim shield 27 rather than bolted. Accordingly, it is intended to cover all such modifications as fall within the scope of the appended claims.

What is claimed is:

1. A forage harvester comprising:
a mobile frame;
a housing mounted on the frame having a forwardly opening crop inlet and a rearwardly disposed crop outlet;
a rotary reel cutterhead rotatably mounted on a transverse axis within said housing between said crop inlet and said crop outlet, said cutterhead including a plurality of knives mounted in fixed position therein and having cutting edges disposed at an obtuse angle to the direction of rotation such that upon rotation, the cutting edges of the knives generate a cylindrical periphery;
a single stationary shear bar extending transversely across the width of said cutterhead in coacting relation therewith and mounted in said housing on the crop inlet side thereof;
an imperforate shield disposed adjacent the periphery of said cutterhead extending from said shear bar in the direction of rotation;
a perforated recutter screen in adjacent peripheral relation to said imperforate shield in the direction of rotation, a portion of said screen being in coacting shearing relation with said cutterhead; and
a raised elongated bar mounted on said imperforate shield and extending adjacent said cutting edge periphery and disposed at an obtuse angle to the direction of rotation of said cutterhead.

2. The invention in accordance with claim 1 and said raised bar comprising one of a plurality of bars parallelly disposed on said surface.

3. The invention in accordance with claim 2 and said obtuse angle of said elongated bars being larger than the obtuse angle of said cutting edges relative to said direction of rotation.

4. The invention in accordance with claim 3 and the raised portion of said bars being so formed as to provide an auxiliary cutting edge.

5. In a forage harvester of the type including a rotary reel cutterhead having a plurality of cutting knives mounted in fixed position thereon and generating a cylindrical cutting periphery upon rotation of said cutterhead and a single stationary shear bar disposed in coacting relation adjacent said cutting periphery, the improvement comprising a peripheral shield having an imperforate surface extending in the direction of rotation from said shear bar to a distal end, a recutter screen having a perforated surface disposed peripherally adjacent said cutting periphery in coacting shearing relation with said cutterhead, said recutter screen abutting said imperforate shield in a manner permitting unobstructed flow of material from the surface of said imperforate shield to the surface of said perforated screen, and a plurality of elongated bars disposed on and raised from said imperforate surface of said shield adjacent said cutting periphery and disposed at an obtuse angle to the direction of rotation such that material on the surface of said imperforate shield moves laterally thereon before reaching the surface of said perforated screen.

6. The invention in accordance with claim 6 and said bars being positioned closely adjacent said cutting periphery and providing a cooperating comminution action therewith.

* * * * *